F. L. BATES.
TOOL HOLDER.
APPLICATION FILED AUG. 21, 1919.

1,331,840.

Patented Feb. 24, 1920.

Inventor,
Fred L. Bates
By Frease, Merkel, Saywell & Bond
Atty's.

UNITED STATES PATENT OFFICE.

FRED L. BATES, OF ALLIANCE, OHIO.

TOOL-HOLDER.

1,331,840.  Specification of Letters Patent.  Patented Feb. 24, 1920.

Application filed August 21, 1919. Serial No. 319,020.

*To all whom it may concern:*

Be it known that I, FRED L. BATES, a citizen of the United States, residing at Alliance, in the county of Stark and State of Ohio, have invented a new and useful Tool-Holder, of which the following is a specification.

The invention relates to improvements in tool holders for metal working machines, such as lathes and planers and more especially to a holder adapted to use short tools which it is practically impossible to hold in the tool post of the lathe and planer.

The objects of the invention are to provide a tool holder whereby the tool may be used a considerably longer time than heretofore and which will at the same time rigidly hold the tool within the tool post and head of the machine.

Further objects of the invention are to provide a tool holder of the character mentioned which may be easily and readily adjusted to accommodate tools of varying lengths and which is so arranged that the tool may be quickly and easily placed within or removed from the holder.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

A practical embodiment of the invention is disclosed in the accompanying drawings, forming a part of this specification in which similar numerals of reference indicate corresponding parts throughout the several views.

Figure 2:
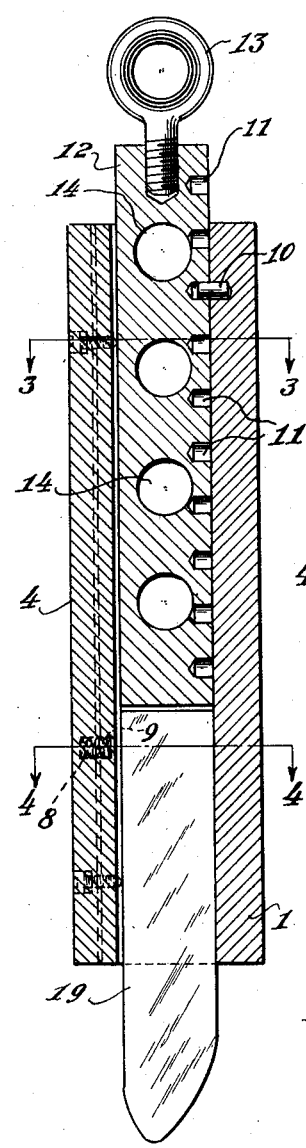
Fig. 2 is a longitudinal sectional view of the same, showing a tool therein.
Figure 1:
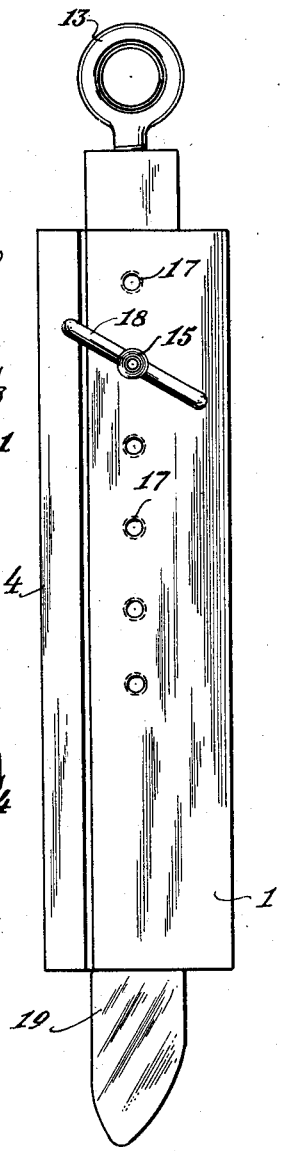
Figure 1 is a side elevation of a tool holder embodying the invention.
Figure 3:
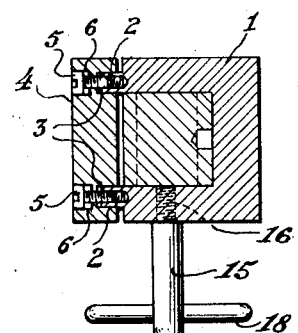
Fig. 3 is a section on the line 3—3, Fig. 2.
Figure 4:
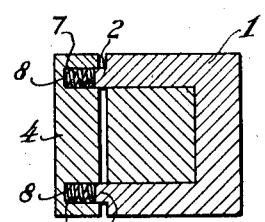
Fig. 4 is a section on the line 4—4, Fig. 2.

The device comprises generally a channel shaped member provided with a cover and a filler block adjustable within the channel shaped member. The tool is placed within the channel shaped member, and is adjusted longitudinally by means of the filler block.

Referring more especially to the construction illustrated in the accompanying drawings, a channel shaped tool holder is indicated at 1, this tool holder being provided with the reduced longitudinally disposed flanges 2 along its edges adapted to accommodate the longitudinal grooves 3 formed in the under face of the cover 4.

The cover is connected to the open side of the channel shaped tool holder by means of screws 5 or their equivalents located near each end of the device, the heads of these screws being located within the enlarged bores 6 which allow for movement of the cover toward or from the tool holder proper.

Near the lower end of the holder, a pair of expansion springs 7 are provided between the tool holder proper and the cover, these springs being located in suitable sockets 8 formed in the cover and similar sockets 9 formed in the reduced flanges 2 of the channel shaped tool holder. These springs normally hold the lower portion of the cover away from the tool holder proper by virtue of the play which the screw heads 5 have within the sockets 6 as above described.

A stud 10 is provided in the inner face of the channel and adapted to accommodate any one of the sockets 11 formed in the rear face of the filler block 12, said filler block being provided with a suitable handle 13 by means of which it may be easily adjusted within the tool holder. For the purpose of lightening the filler block enlarged apertures 14 are provided therein.

For the purpose of limiting the position of the tool holder within the tool post or head of the machine a stop pin 15 provided with a reduced screw threaded extremity 16 is arranged to be located in any one of the screw threaded apertures 17 formed in one side of the channel shaped tool holder, this stop pin being provided with a handle 18 by means of which it may be easily adjusted.

The tool which is indicated in the drawings by the numeral 19 is placed within the tool holder, the inner end thereof butting against the end of the filler block and the holder is clamped within the tool post of the lathe or the head of the planer clamping the tool rigidly within the tool holder.

It will be understood that the filler block should first be adjusted to accommodate the length of the tool desired to be used within the tool holder and the springs 7 will hold the cover 4 away from the tool holder proper, allowing the tool to be easily inserted within the tool holder. When the tool holder is removed from the tool post or head of the machine the springs will move the cover outwardly away from the tool holder proper allowing the tool to be easily removed from the tool holder.

With this tool holder it will be seen that tools of any length may be held rigidly within the tool holder when it is placed in the tool post or head of the machine, lengthening the life of the tools and permitting them to be used as long as there is sufficient length of the shank of the tool to be inserted into the tool holder.

I claim:—

1. A tool holder comprising a channel shaped member having a stud upon its inner side, a filler block provided with a plurality of sockets arranged to selectively engage said stud, a cover loosely connected to the channel shaped member and springs arranged to normally hold the cover away from the channel shaped member, the tool holder being arranged to receive a tool and to be clamped to the head of a metal working machine.

2. A tool holder comprising a channel shaped member arranged to receive a tool, an adjustable filler block located within the channel shaped member, a cover loosely attached to the channel shaped member and springs interposed between the channel shaped member and cover near the end thereof, which receives the tool and arranged to be clamped to the head of a metal working machine.

3. A tool holder comprising a channel shaped member arranged to receive a tool, a filler block adjustably mounted therein, a cover loosely connected to the channel shaped member, springs arranged to normally hold the end of the cover adjacent the tool away from the channel shaped member and a stop pin adjustable upon the channel shaped member, the tool holder arranged to be clamped to the head of a metal working machine.

In testimony that I claim the above, I have hereunto subscribed my name.

FRED L. BATES.